(12) United States Patent
Chiyo et al.

(10) Patent No.: US 12,057,251 B2
(45) Date of Patent: Aug. 6, 2024

(54) COIL COMPONENT AND WIRELESS COMMUNICATION DEVICE HAVING THE SAME

(71) Applicant: TDK CORPORATION, Tokyo (JP)

(72) Inventors: Noritaka Chiyo, Tokyo (JP); Masaki Matsushima, Tokyo (JP); Tomohiro Moriki, Tokyo (JP); Takuya Yoshida, Tokyo (JP); Toshio Tomonari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 360 days.

(21) Appl. No.: 17/018,283

(22) Filed: Sep. 11, 2020

(65) Prior Publication Data
US 2021/0110962 A1 Apr. 15, 2021

(30) Foreign Application Priority Data
Oct. 2, 2019 (JP) .................................. 2019-182318

(51) Int. Cl.
| | | |
|---|---|---|
| *H01F 27/28* | (2006.01) | |
| *H02J 50/10* | (2016.01) | |
| *H04B 5/79* | (2024.01) | |
| *H02J 7/02* | (2016.01) | |

(52) U.S. Cl.
CPC .......... *H01F 27/2804* (2013.01); *H02J 50/10* (2016.02); *H04B 5/79* (2024.01); *H01F 2027/2809* (2013.01); *H02J 7/02* (2013.01)

(58) Field of Classification Search
CPC ......... H01F 27/2804; H02J 50/10; H02J 7/02; H04B 5/0037

USPC .......................................................... 336/200
See application file for complete search history.

(56) References Cited

U.S. PATENT DOCUMENTS

| | | | |
|---|---|---|---|
| 2014/0168019 A1* | 6/2014 | Hirobe ................. | H04B 5/0075 343/788 |
| 2015/0077596 A1 | 3/2015 | Ryu et al. | |
| 2015/0381239 A1* | 12/2015 | Shostak .............. | H04B 5/0037 343/720 |
| 2016/0218549 A1* | 7/2016 | Hirobe ................... | H01Q 1/243 |
| 2016/0329735 A1* | 11/2016 | Helberg ................. | H01F 27/36 |
| 2016/0352138 A1* | 12/2016 | Hirobe ..................... | H01Q 7/06 |
| 2018/0159598 A1* | 6/2018 | Ahn ........................ | H01F 5/003 |
| 2018/0174747 A1* | 6/2018 | Hirobe ............... | H02J 7/00034 |
| 2018/0198190 A1* | 7/2018 | Leem ...................... | H01Q 7/00 |
| 2018/0301794 A1* | 10/2018 | Lee ........................ | H04B 1/385 |

FOREIGN PATENT DOCUMENTS

| | | |
|---|---|---|
| JP | 2015513276 A | 4/2015 |
| JP | 2018060979 A | 4/2018 |
| JP | 2019-102699 A | 6/2019 |
| WO | 2017119215 A1 | 7/2017 |

\* cited by examiner

*Primary Examiner* — Alfonso Perez Borroto
(74) *Attorney, Agent, or Firm* — YOUNG LAW FIRM, P.C.

(57) ABSTRACT

Disclosed herein is a coil component that includes a substrate having a first surface, and first and second coil patterns coaxially formed on the first surface of the substrate and electrically isolated from each other. The first coil pattern has a plurality of turns including a first turn and a second turn. A predetermined turn of the second coil pattern is disposed between the first and second turns of the first coil pattern.

20 Claims, 13 Drawing Sheets

COIL COMPONENT AND WIRELESS COMMUNICATION DEVICE HAVING THE SAME

BACKGROUND OF THE INVENTION

Field of the Invention

The present invention relates to a coil component and a wireless communication device having the same and, more particularly, to a coil component having two coaxial coil patterns with different functions and a wireless communication device using the same.

Description of Related Art

A coil component having two coaxial coil patterns with different functions is described in JP 2018-060979A and JP 2015-513276. The coil components described in JP 2018-060979A and JP 2015-513276 have a structure in which a coil pattern for NFC (Near Field Communication) and a coil pattern for wireless power transmission are coaxially formed on a substrate.

However, in the coil components described in JP 2018-060979A and JP 2015 513276, the coil pattern for wireless power transmission is disposed in the inner diameter portion of the coil pattern for NFC, so that the outer diameter size of the coil pattern for wireless power communication is restricted to less than the inner diameter size of the coil pattern for NFC. This prevents characteristics of the coil pattern for wireless power transmission from being improved sufficiently. Such a problem occurs not only when the coil pattern for NFC and the coil pattern for wireless power transmission are coaxially disposed, but also when two coil patterns with different functions are coaxially formed on a substrate.

SUMMARY

It is therefore an object of the present invention to provide a coil component in which two coaxial coil patterns with different functions each have a sufficient outer diameter size. Another object of the present invention is to provide a wireless communication device having such a coil component.

A coil component according to the present invention includes a substrate and first and second coil patterns coaxially formed on one surface of the substrate and electrically isolated from each other. The first coil pattern has a plurality of turns including a first turn and a second turn. A predetermined turn of the second coil pattern is disposed between the first and second turns of the first coil pattern.

According to the present invention, the outer diameter size of the second coil pattern can be made larger than the inner diameter size of the first coil pattern.

In the present invention, the first and second coil patterns may be different in the number of turns. This can independently optimize the coil characteristics of the first coil pattern and the coil characteristics of the second coil pattern. In this case, the second coil pattern may have a larger number of turns than the first coil pattern. This can increase the inductance of the second coil pattern.

In the present invention, the first turn may be the outermost turn of the first coil pattern, the second turn may be the second outermost turn of the first coil pattern, and the predetermined turn may be the outermost turn of the second coil pattern. This allows the outer diameter size of the second coil pattern to be substantially the same as the outer diameter size of the first coil pattern.

In the present invention, the pattern width of the predetermined turn of the second coil pattern may be larger than the pattern width of the first turn of the first coil pattern. This can further reduce a difference between the outer diameter size of the second coil pattern and the outer diameter size of the first coil pattern.

In the present invention, the turns constituting the second coil pattern may be radially divided into a plurality of lines by a spiral-shaped slit. This equalizes the density distribution of current flowing in the second coil pattern, thereby allowing reduction in a DC resistance and an AC resistance. In this case, the plurality of lines may include a first line positioned on the innermost peripheral side, a second line positioned on the outermost peripheral side, and a third line positioned between the first and second lines, and the pattern width of each of the first and second lines may be smaller than the pattern width of the third line. This can reduce heat generation due to eddy current. Further, in this case, the pattern width of the first line may be smaller than the pattern width of the second line. This can further reduce heat generation due to eddy current.

In the present invention, the turns constituting the first coil pattern may be radially divided into a plurality of lines by a spiral-shaped slit. This equalizes the density distribution of current flowing in the first coil pattern, thereby allowing reduction in a DC resistance and an AC resistance.

The coil component according to the present invention may further include third and fourth coil patterns coaxially formed on the other surface of the substrate and electrically isolated from each other, wherein the inner peripheral end of the third coil pattern may be connected to the inner peripheral end of the first coil pattern, and the inner peripheral end of the fourth coil pattern may be connected to the inner peripheral end of the second coil pattern. This increases the number of turns of each of the two coils and eliminates the need to provide a connection pattern for leading the inner peripheral end of each coil pattern to the outside.

In this case, the first and third coil patterns may have the same pattern shape, and the second and fourth coil patterns may have the same pattern shape. Thus, coil patterns can be formed on the front and back surfaces of the substrate using the same mask pattern.

A wireless communication device according to the present invention includes the above coil component, a wireless communication circuit connected to one of the first and second coil patterns, and a wireless power transmission circuit connected to the other one of the first and second coil patterns.

According to the present invention, it is possible to achieve both wireless communication characteristics and a wireless power transmission circuit.

Thus, according to the present invention, there can be provided a coil component in which two coaxial coil patterns with different functions each have a sufficient outer diameter size. Further, according to the present invention, there can be provided a wireless communication device having such a coil component.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Hereinafter, a preferred embodiment of the present invention will be described with reference to the accompanying drawings.

Figure 1:
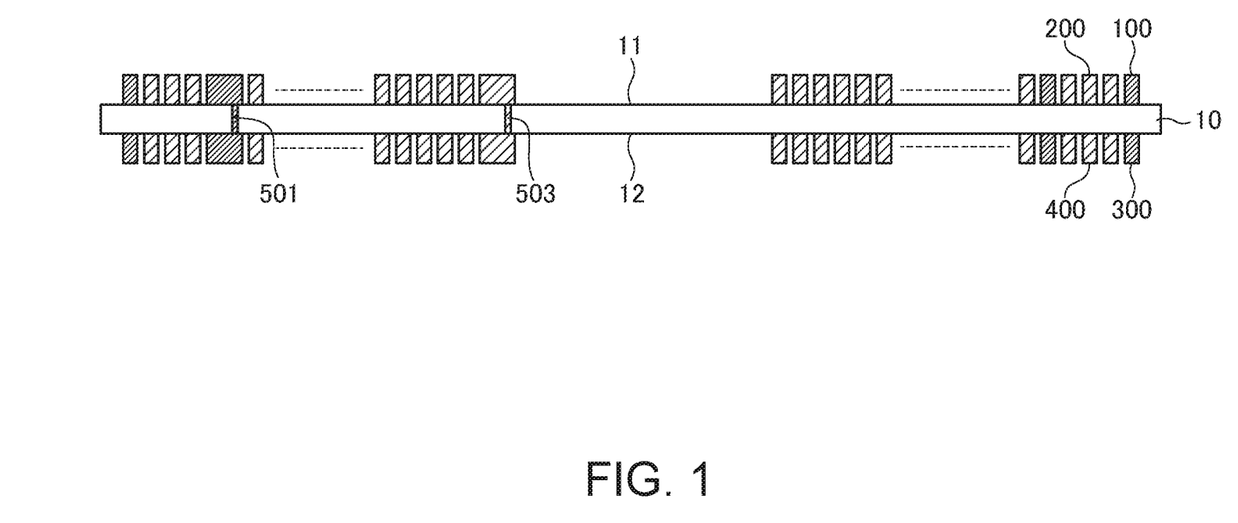
FIG. 1 is a schematic cross-sectional view illustrating the configuration of a coil component according to an embodiment of the present invention.

FIG. 1 is a schematic cross-sectional view illustrating the configuration of a coil component according to an embodiment of the present invention.

As illustrated in FIG. 1, the coil component according to the present embodiment includes a substrate 10, first and second coil patterns 100 and 200 formed on one surface 11 of the substrate 10, and third and fourth coil patterns 300 and 400 formed on the other surface 12 of the substrate 10. Although details will be described later, the inner peripheral end of the first coil pattern 100 and the inner peripheral end of the third coil pattern 300 are connected to each other through a connection part 501 formed so as to penetrate the substrate 10, and the inner peripheral end of the second coil pattern 200 and the inner peripheral end of the fourth coil pattern 400 are connected to each other through a plurality of connection parts 502 to 504 (only a connection part 503 is illustrated in the cross section of FIG. 1) formed so as to penetrate the substrate 10.

There is no particular restriction on the material of the substrate 10, and a transparent or translucent flexible insulating material such as PET resin may be used. Alternatively, the substrate 10 may be a flexible substrate obtained by impregnating glass cloth with epoxy-based resin.

Figure 2:
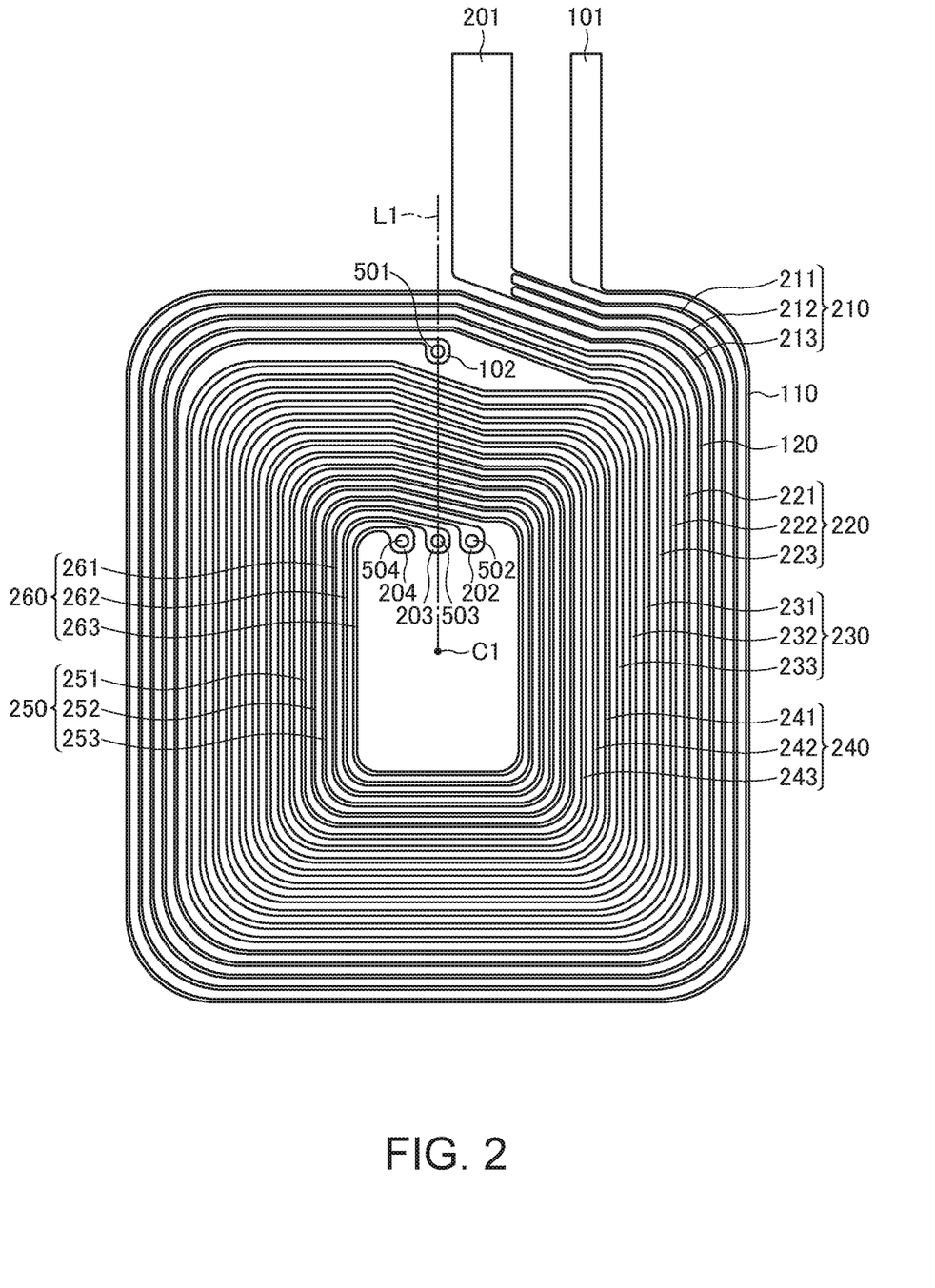
FIG. 2 is a plan view for explaining pattern shapes of first and second coil patterns 100 and 200.

FIG. 2 is a plan view for explaining the pattern shapes of the first and second coil patterns 100 and 200 as viewed from the side of the surface 11 of the substrate 10.

As illustrated in FIG. 2, the first coil pattern 100 is constituted of turn 110 positioned at the outermost periphery and a turn 120 positioned at the second outermost periphery. That is, the first coil pattern 100 has a two-turn configuration. An outer peripheral end 101 of the first coil pattern 100 is led out radially with the pattern width thereof increased. An inner peripheral end 102 of the first coil pattern 100 is connected to the connection part 501.

The second coil pattern 200 has a six-turn configuration constituted of turns 210, 220, 230, 240, 250, and 260. The turn 210 is the outermost turn positioned at the outermost periphery, and the turn 260 is the innermost turn positioned at the innermost periphery. The outermost turn 210 is disposed between the turns 110 and 120 of the first coil pattern 100. The rest of the turns, 220, 230, 240, 250, and 260, are disposed in the inner diameter area of the first coil pattern 100. Thus, the first coil pattern 100 and second coil pattern 200 are constituted by spiral-shaped planar conductors which are coaxially wound. The first coil pattern 100 and the second coil pattern 200 are not connected to each other and electrically isolated from each other. The term "coaxial" used herein includes not only a case where the center points of two coil patterns completely coincide with each other, but also a case where the center point of one coil pattern overlaps the inner diameter area of the other coil pattern.

The turns 210, 220, 230, 240, 250, and 260 are each radially divided into three parts by two spiral-shaped slits. That is, the turn 210 is divided into three lines 211 to 213, the turn 220 is divided into three lines 221 to 223, the turn 230 is divided into three lines 231 to 233, the turn 240 is divided into three lines 241 to 243, the turn 250 is divided into three lines 251 to 253, and the turn 260 is divided into three lines 261 to 263. The lines 211, 221, 231, 241, 251, and 261 are positioned outside the lines 212, 222, 232, 242, 252, and 262, and the lines 213, 223, 233, 243, 253, and 263 are positioned inside the lines 212, 222, 232, 242, 252, and 262. Since the turns 210, 220, 230, 240, 250, and 260 constituting the second coil pattern 200 are each thus radially divided into three parts, the pattern width of each of the turns 210, 220, 230, 240, 250, and 260 is larger than the pattern width of each of the turns constituting the first coil pattern 100. The term "pattern width" used herein refers to the radial width of the planar conductor and, when each turn is divided into a plurality of lines like the second coil pattern 200, the "pattern width" refers to the total width of the plurality of lines.

An outer peripheral end 201 of the second coil pattern 200 is radially led out with the pattern width thereof increased. The second coil pattern 200 has three inner peripheral ends: an inner peripheral end 202 which is the end of the line 261; an inner peripheral end 203 which is the end of the line 262; and an inner peripheral end 204 which is the end of the line 263. The inner peripheral ends 202 to 204 are connected respectively to the connection parts 502 to 504.

Figure 3:
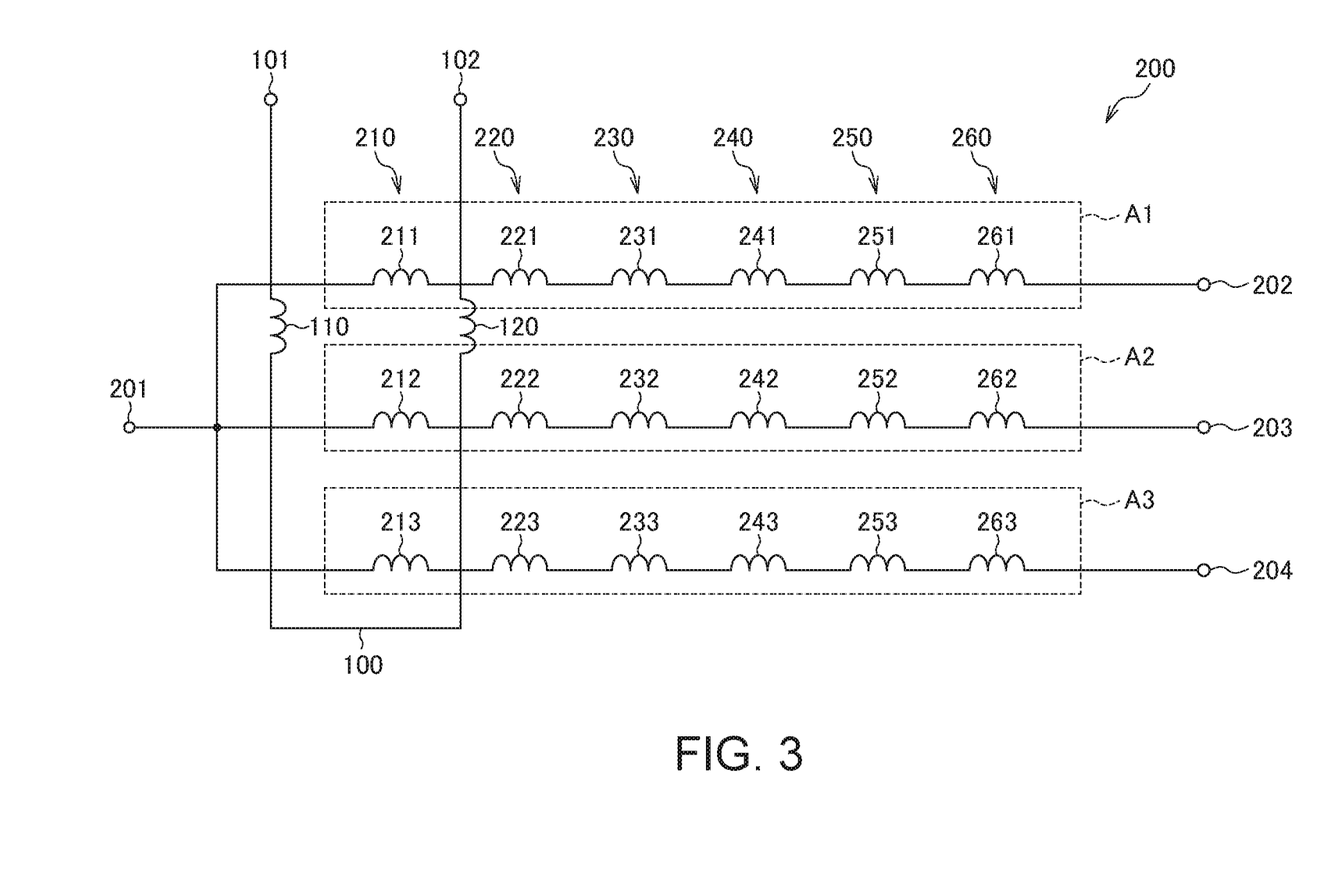
FIG. 3 is an equivalent circuit diagram of the first and second coil patterns 100 and 200.

Thus, as illustrated in FIG. 3, the outermost lines 211, 221, 231, 241, 251, and 261 positioned on the outermost peripheral side constitute a division pattern A1 connected in series between the outer peripheral end 201 and the inner peripheral end 202, the center lines 212, 222, 232, 242, 252, and 262 positioned at the center constitute a division pattern A2 connected in series between the outer peripheral end 201 and the inner peripheral end 203, and the innermost lines 213, 223, 233, 243, 253, and 263 positioned on the innermost peripheral side constitute a division pattern A3 connected in series between the outer peripheral end 201 and the inner peripheral end 204. The first coil pattern 100 is also illustrated in FIG. 3, and the turn 210 of the second coil pattern 200 is disposed between the turns 110 and 120 of the first coil pattern 100.

As illustrated in FIG. 2, when a virtual line L1 radially extending from a center point C1 of the first and second coil patterns 100 and 200 is drawn, the connection parts 501 and 503 are disposed on the virtual line L1. The connection parts 502 and 504 are disposed in symmetrical positions with respect to the virtual line L1.

Figure 4:
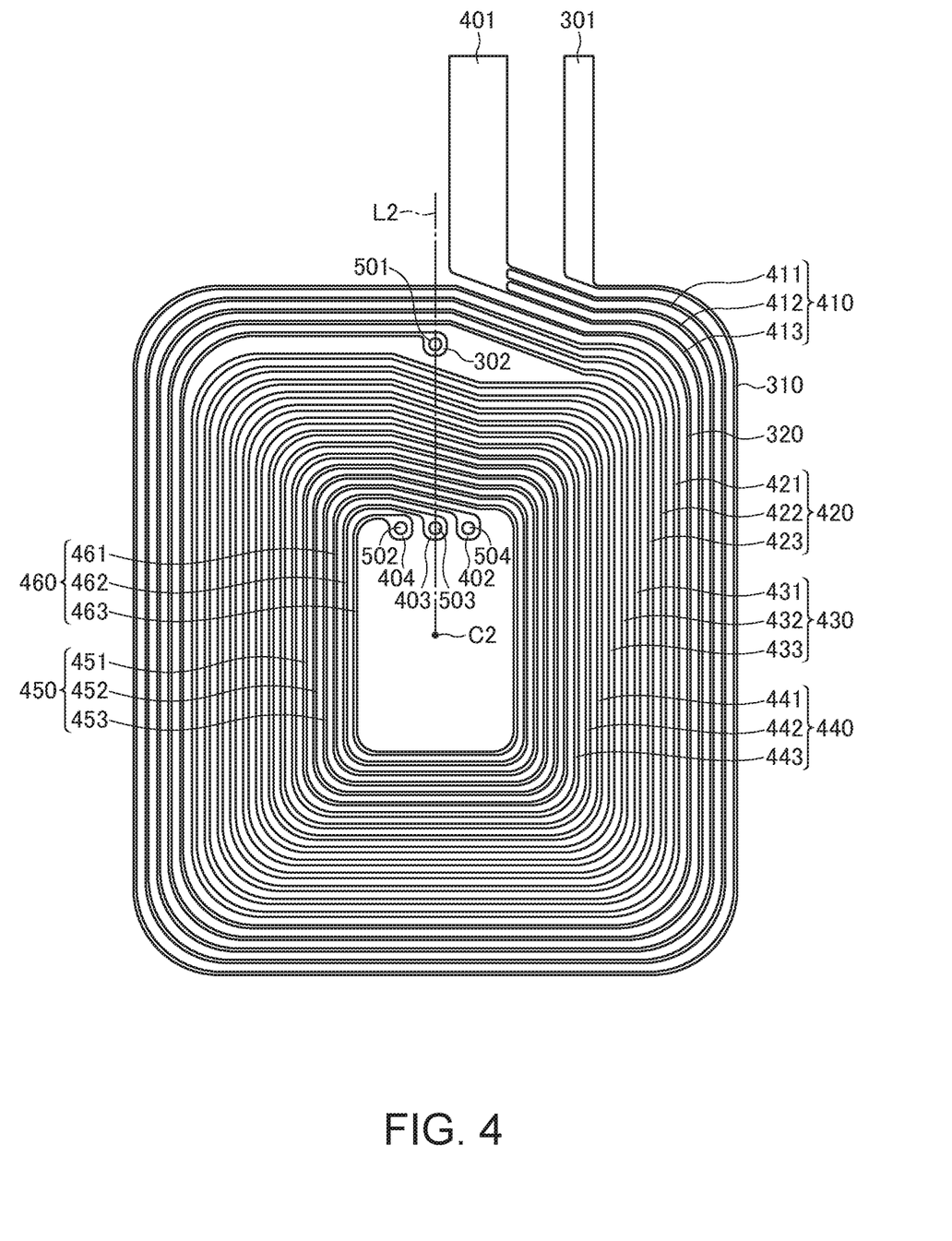
FIG. 4 is a plan view for explaining pattern shapes of third and fourth coil patterns 300 and 400.

FIG. 4 is a plan view for explaining pattern shapes of the third and fourth coil patterns 300 and 400 as viewed from the side of the surface 12 of the substrate 10.

As illustrated in FIG. 4, the pattern shapes of the third and fourth coil patterns 300 and 400 are the same as those of the first and second coil patterns 100 and 200, respectively. Thus, the first and second coil patterns 100, 200 and third and fourth coil patterns 300, 400 can be produced using the same mask, allowing a significant reduction in manufacturing cost.

The third coil pattern 300 is constituted of a turn 310 positioned at the outermost periphery and a turn 320 positioned at the second outermost periphery. That is, the third coil pattern 300 has a two-turn configuration. An outer peripheral end 301 of the third coil pattern 300 is led out radially with the pattern width thereof increased. An inner peripheral end 302 of the third coil pattern 300 is connected to the connection part 501.

The fourth coil pattern 400 has a six-turn configuration constituted of turns 410, 420, 430, 440, 450, and 460. The turn 410 is the outermost turn, and the turn 460 is the innermost turn. The outermost turn 410 is disposed between the turns 310 and 320 of the third coil pattern 300. The rest of the turns, 420, 430, 440, 450, and 460, are disposed in the inner diameter area of the third coil pattern 300. Thus, the third coil pattern 300 and fourth coil pattern 400 are constituted by spiral-shaped planar conductors which are coaxially wound. The third coil pattern 300 and the fourth coil pattern 400 are not connected to each other and electrically isolated from each other.

The turns 410, 420, 430, 440, 450, and 460 are each radially divided into three parts by two spiral-shaped slits. That is, the turn 410 is divided into three lines 411 to 413, the turn 420 is divided into three lines 421 to 423, the turn 430 is divided into three lines 431 to 433, the turn 440 is divided into three lines 441 to 443, the turn 450 is divided into three lines 451 to 453, and the turn 460 is divided into three lines 461 to 463. The lines 411, 421, 431, 441, 451, and 461 are positioned outside the lines 412, 422, 432, 442, 452, and 462, and the lines 413, 423, 433, 443, 453, and 463 are positioned inside the lines 412, 422, 432, 442, 452, and 462. Since the turns 410, 420, 430, 440, 450, and 460 constituting the fourth coil pattern 400 are each thus radially divided into three parts, the pattern width of each of the turns 410, 420, 430, 440, 450, and 460 is larger than the pattern width of each of the turns constituting the third coil pattern 300

An outer peripheral end 401 of the fourth coil pattern 400 is radially led out with the pattern width thereof increased. The fourth coil pattern 400 has three inner peripheral ends: an inner peripheral end 402 which is the end of the line 461; an inner peripheral end 403 which is the end of the line 462; and an inner peripheral end 404 which is the end of the line 463. The inner peripheral ends 402 to 404 are connected respectively to the connection portions 504, 503, and 502.

Figure 5:
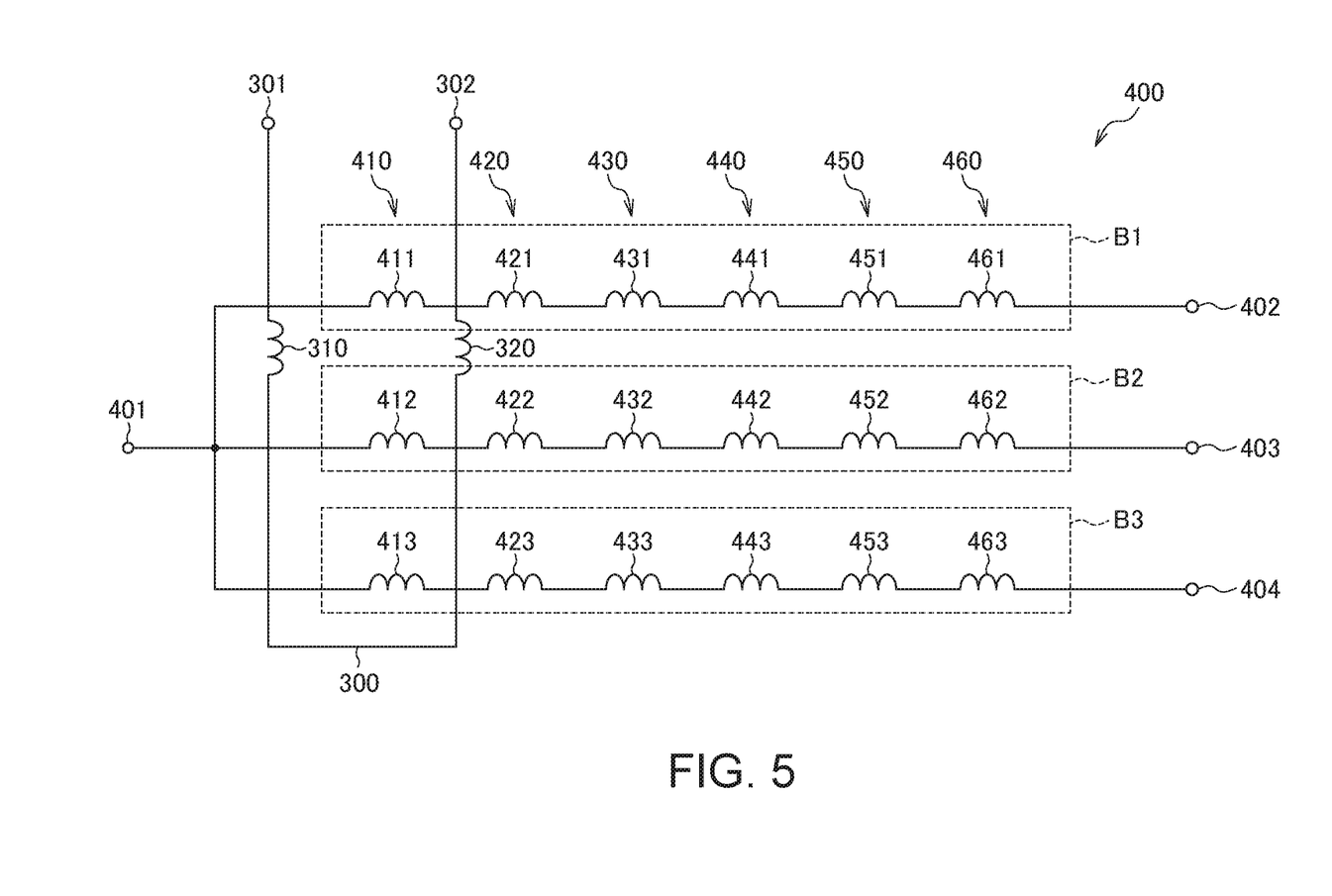
FIG. 5 is an equivalent circuit diagram of the third and fourth coil patterns 300 and 400.

Thus, as illustrated in FIG. 5, the outermost lines 411, 421, 431, 441, 451, and 461 constitute a division pattern B1 connected in series between the outer peripheral end 401 and the inner peripheral end 402, the center lines 412, 422, 432, 442, 452, and 462 constitute a division pattern B2 connected in series between the outer peripheral end 401 and the inner peripheral end 403, and the innermost lines 413, 423, 433, 443, 453, and 463 constitute a division pattern B3 connected in series between the outer peripheral end 401 and inner peripheral end 404. The third coil pattern 300 is also illustrated in FIG. 5, and the turn 410 of the fourth coil pattern 400 is disposed between the turns 310 and 320 of the third coil pattern 300.

As illustrated in FIG. 4, when a virtual line L2 radially extending from a center point C2 of the third and fourth coil patterns 300 and 400 is drawn, the connection parts 501 and 503 are disposed on the virtual line L2. The connection parts 502 and 504 are disposed in symmetrical positions with respect to the virtual line L2.

Figure 6:
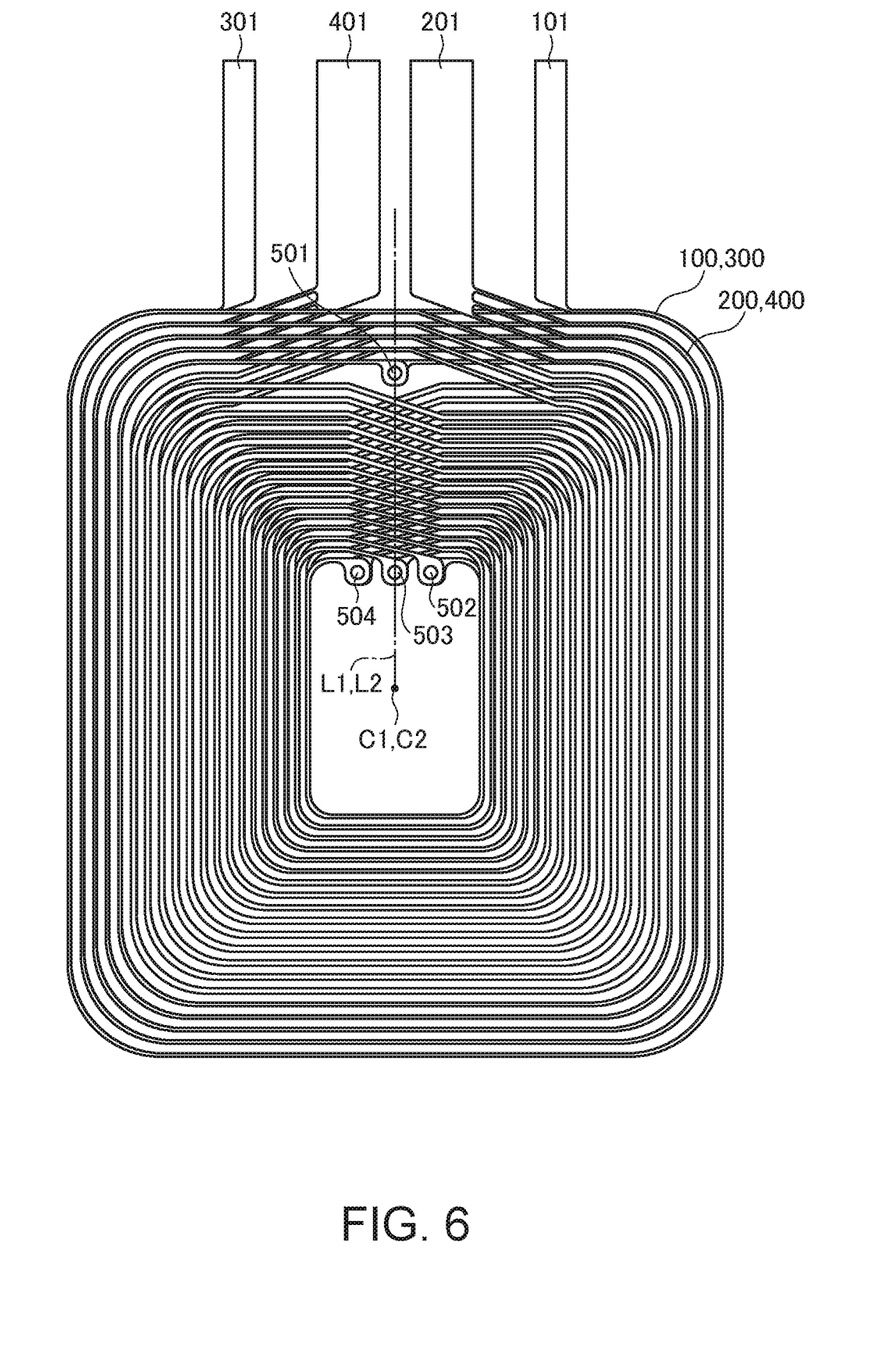
FIG. 6 is a transparent plan view illustrating a state where the first and second coil patterns 100, 200 and the third and fourth coil patterns 300, 400 overlap each other.
Figure 7:
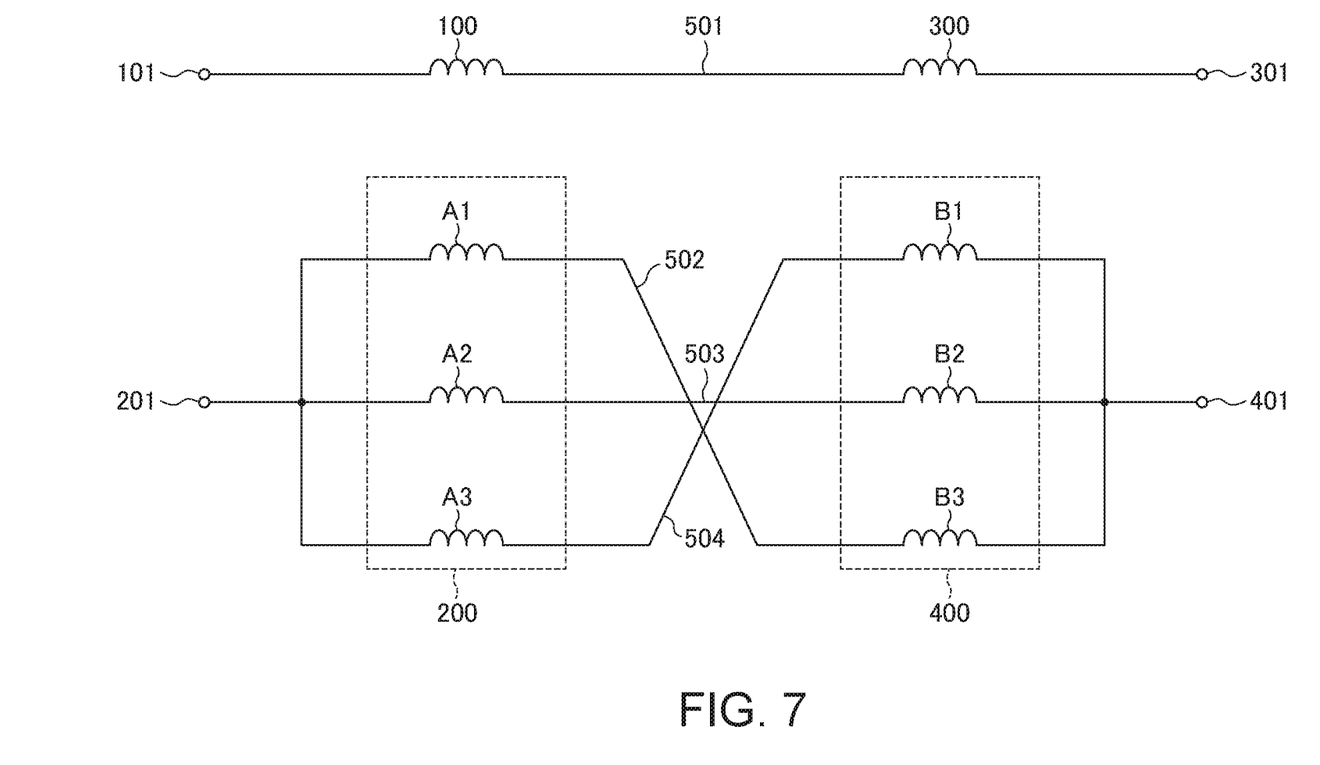
FIG. 7 is an equivalent circuit diagram of the coil component according to the embodiment of the present invention.

The thus configured first and second coil patterns 100, 200 and third and fourth coil patterns 300, 400 are formed on the front and back surfaces of the substrate 10 such that, as illustrated in FIG. 6, the center points C1 and C2 overlap each other and that virtual lines L1 and L2 overlap each other. As a result, as illustrated in FIG. 7, the first coil pattern 100 and the third coil pattern 300 are connected in series through the connection part 501 to thereby form a spiral coil having four turns in total. Further, the second coil pattern 200 and the fourth coil pattern 400 are connected in series through the connection parts 502 to 504 to thereby form a spiral coil having 12 turns in total. The division patterns A1, A2, and A3 are connected to the division patterns B3, B2, and B1, respectively. That is, the outermost division pattern A1 is connected to the innermost division pattern B3, and the innermost division pattern A3 is connected to the outermost division pattern B1.

Figure 8:
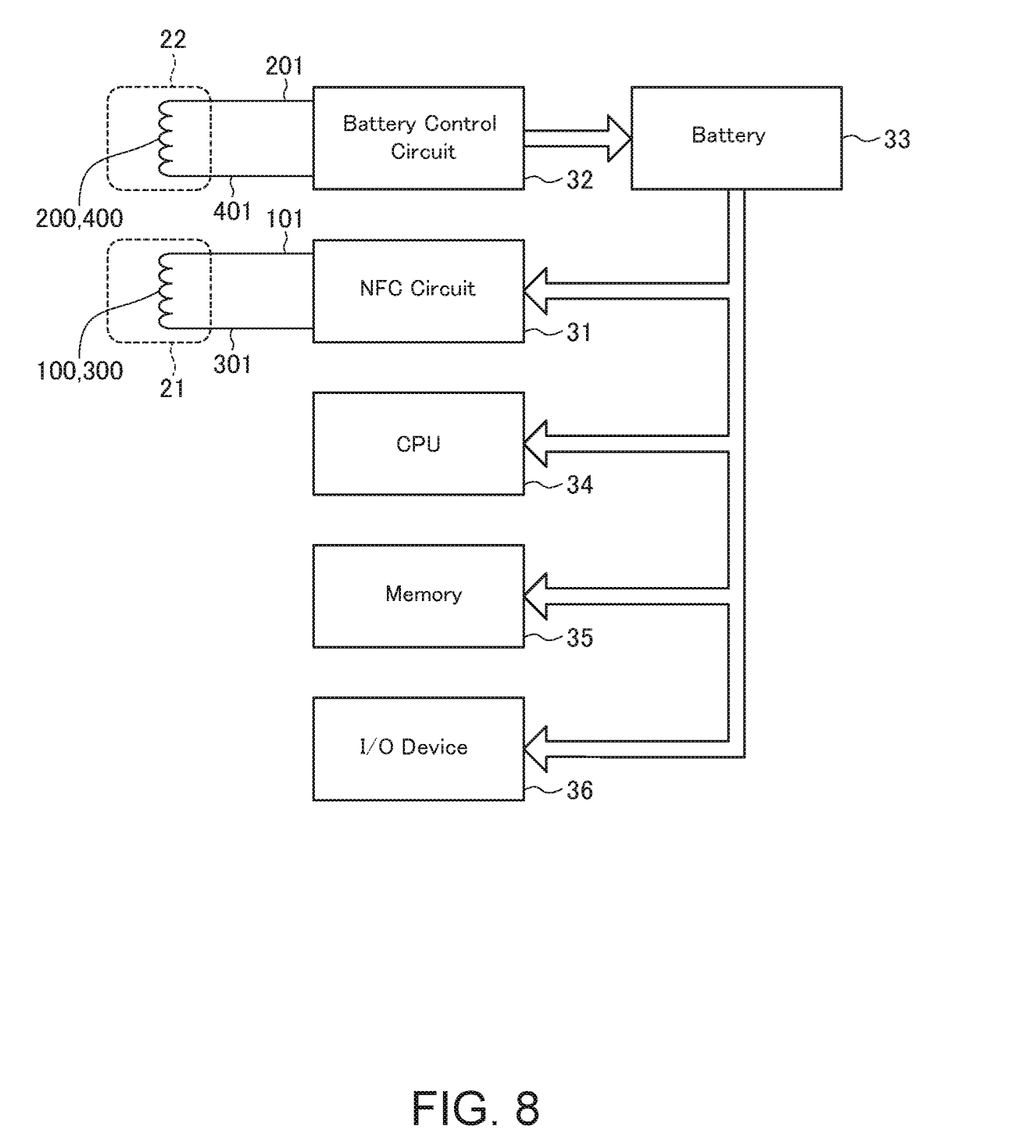
FIG. 8 is a block diagram for explaining the configuration of a wireless communication device having the coil component according to the embodiment of the present invention.

FIG. 8 is a block diagram for explaining the configuration of a wireless communication device having the coil component according to the present embodiment.

The wireless communication device illustrated in FIG. 8 is a mobile information terminal such as a smartphone and includes an NFC antenna 21 constituted of the first and third coil patterns 100 and 300 and a wireless power receiving coil 22 constituted of the second and fourth coil patterns 200 and 400. The NFC antenna 21 is connected to an NFC circuit 31, and the wireless power receiving coil 22 is connected to a battery control circuit 32. The NFC circuit 31 is a wireless communication circuit for data transmission/reception through the NFC antenna 21. The battery control circuit 32 is a wireless power transmission circuit for charging a battery with power received through the wireless power receiving coil 22. The power stored in the battery 33 is supplied to a CPU 34, a memory 35, an I/O device 36, and the like included in the wireless communication device.

As illustrated in FIG. 8, the NFC antenna 21 and the NFC circuit 31 are connected to each other through the outer peripheral end 101 of the first coil pattern 100 and the outer peripheral end 301 of the third coil pattern 300. Similarly, the wireless power receiving coil 22 and the battery control circuit 32 are connected to each other through the outer peripheral end 201 of the second coil pattern 200 and the outer peripheral end 401 of the fourth coil pattern 400. Thus, there is no need to provide a connection pattern for connecting the inner peripheral end of each coil pattern and the NFC circuit 31 or battery control circuit 32.

Figure 9:
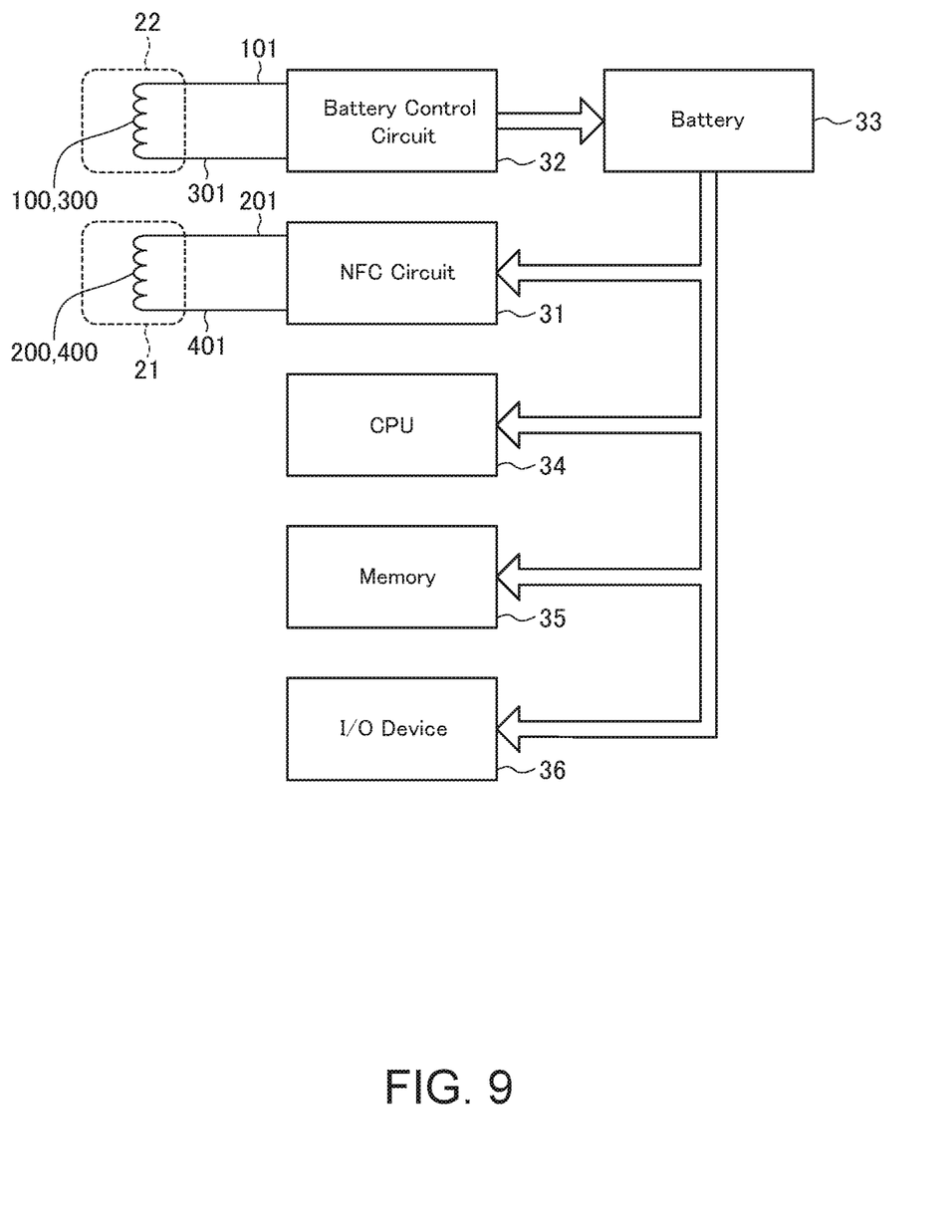
FIG. 9 is a block diagram for explaining the configuration of a wireless communication device having a coil component according to a modification.

Alternatively, like a wireless communication device illustrated in FIG. 9, the second and fourth coil patterns 200 and 400 may be used as the NFC antenna 21, and the first and third coil patterns 100 and 300 may be used as the wireless power receiving coil 22. In this case, the NFC antenna 21 and the NFC circuit 31 are connected to each other through the outer peripheral end 201 of the second coil pattern 200 and the outer peripheral end 401 of the fourth coil pattern 400, and the wireless power receiving coil 22 and the battery control circuit 32 are connected to each other through the outer peripheral end 101 of the first coil pattern 100 and the outer peripheral end 301 of the third coil pattern 300.

As described above, in the coil component according to the present embodiment, the outermost turn 210 of the second coil pattern 200 is disposed between the turns 110 and 120 of the first coil pattern 100, and the outermost turn 410 of the fourth coil pattern 400 is disposed between the turns 310 and 320 of the third coil pattern 300. Thus, as compared to a case where the second and fourth coil patterns 200 and 400 are disposed respectively in the inner diameter areas of the first and third coil patterns 100 and 300, the outer diameter sizes of the second and fourth coil patterns 200 and 400 can be increased to thereby increase the inductances of the second and fourth coil patterns 200 and 400. In addition, the outermost turns 210 and 410 of the second and fourth coil patterns 200 and 400 each with a larger pattern width are disposed inside the outermost turns 110 and 310 of the first and third coil patterns each with a smaller pattern width, respectively, so that it is possible to minimize reduction in the outer diameter sizes of the second and fourth coil patterns 200 and 400 that can be achieved due to disposition of the second and fourth coil patterns 200 and 400 inside the respective first and third coil patterns 100 and 300, while maximizing the outer diameter sizes of the first and third coil patterns 100 and 300.

In addition, in the coil component according to the present embodiment, each of the turns constituting the second and fourth coil patterns 200 and 400 is radially divided into three parts by the spiral-shaped slits, so that, as compared to a case where such a slit is not formed, uneven distribution of current density can be reduced. As a result, even when the second and fourth coil patterns 200 and 400 constitute, for example, the wireless power receiving coil 22 and thus require a large current, a DC resistance and an AC resistance can be reduced. Further, the division pattern A1 positioned on the outer peripheral side of the second coil pattern 200 is connected to the division pattern B3 positioned on the inner peripheral side of the fourth coil pattern 400, and the division pattern A3 positioned on the inner peripheral side of the second coil pattern 200 is connected to the division pattern B1 positioned on the outer peripheral side of the fourth coil pattern 400, thereby canceling a difference between dimensions of inner and outer peripheries. As a result, it is possible to further reduce the DC and AC resistance.

The pattern width of each of the second and fourth coil patterns 200 and 400 need not be constant, and a configuration may be possible in which the pattern width is made small on the inner and outer peripheral sides and made large on the center side.

Figure 10:
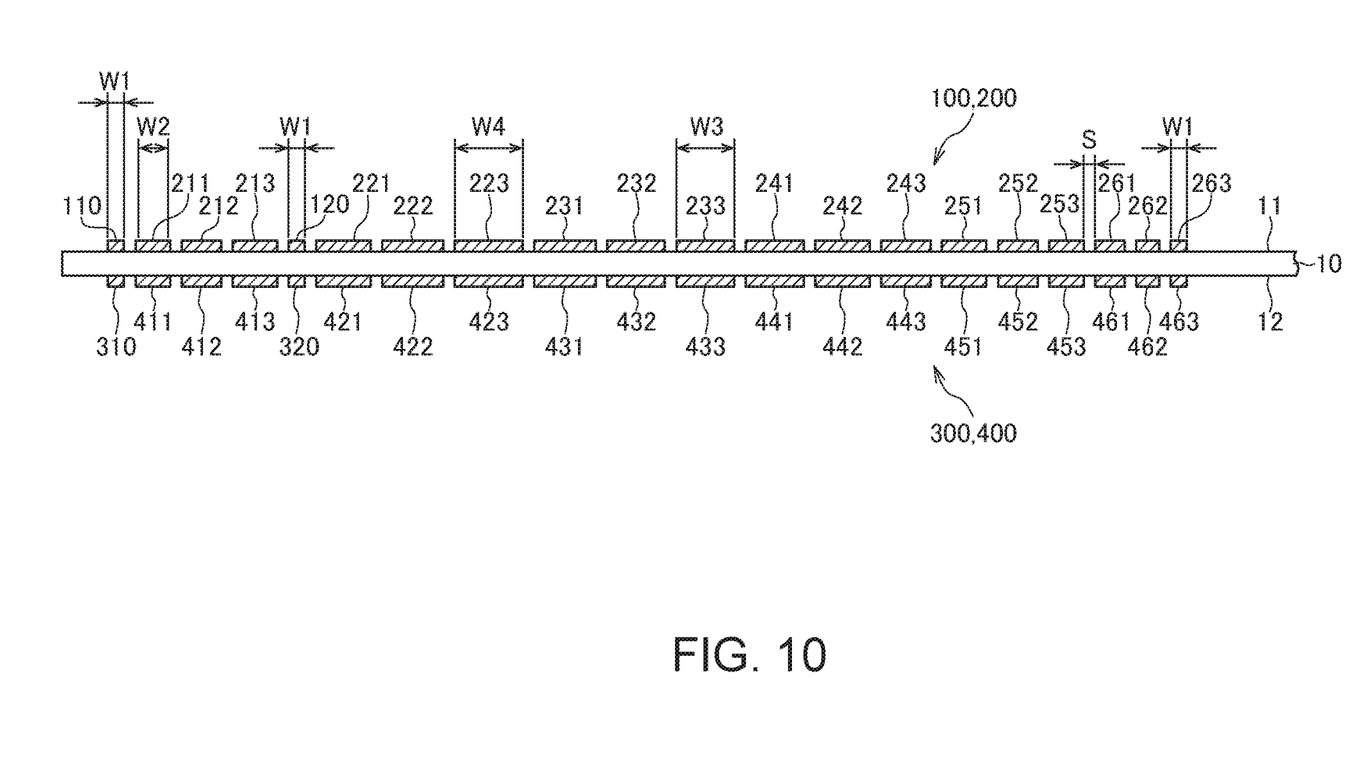
FIG. 10 is a schematic cross-sectional view illustrating an example in which the pattern width of each of the second and fourth coil patterns 200 and 400 is changed depending on the radial direction position.

Specifically, in the example illustrated in FIG. 10, assuming that the pattern width of each of the lines 263 and 463 constituting the innermost turn is W1, the pattern width of each of the lines 211 and 411 constituting the outermost turn is W2, the pattern width of each of the lines 233 and 433 (or 241 and 441) constituting the middle turn whose turn number counted from the innermost or outermost turn is intermediate among all the turns is W3, and the pattern width of each of the lines 223 and 423 positioned at the center of the coil pattern line length in the line extending direction is W4, $W1<W2<W3<W4$ is satisfied.

The reason that the pattern widths W1 and W2 of the respective innermost and outermost turns are reduced is because the intensity of a magnetic field at these portions is strong, and thus a large loss is generated by heat generation caused due to eddy current. That is, by reducing the pattern widths W1 and W2 of the respective innermost and outermost turns, the amount of magnetic flux that interferes with the innermost and outermost turns is reduced, thereby making it possible to reduce eddy current. The pattern width W1 of the innermost turn is preferably larger than the pattern thickness of each of the second and fourth coil patterns 200 and 400. This allows eddy current flowing in the coil patterns 200 and 400 to concentrate on radially opposite sides of the conductive pattern, so that it is possible to obtain a remarkable loss reduction effect obtained by reducing the pattern width of each of the second and fourth coil patterns 200 and 400.

Further, in the example illustrated in FIG. 10, the pattern width W1 of the innermost turn is smallest. The pattern width is increased gradually or stepwise from the innermost turn toward the center position of the line length, and the pattern width W4 at the center position of the line length is largest. The pattern width is then reduced gradually or stepwise from the center position of the line length toward the outermost turn, and the pattern width becomes W2 at the outermost turn. The reason that the pattern width W1 of the innermost turn is smaller than the pattern width W2 of the outermost pattern is because the intensity of a magnetic field is stronger at the innermost turn than at the outermost turn. The reason that the pattern width W4 at the center position of the line length is largest is that the intensity of a magnetic field is weaker at the center of the line length than at the middle turn.

Further, the pattern thickness of the conductive pattern may be smaller in the innermost turn than in the outermost pattern. Particularly, the pattern thickness is preferably reduced gradually or stepwise from the outermost turn toward the innermost turn. With this configuration, a loss reduction effect obtained by reducing the pattern width becomes remarkable on the inner peripheral side which is affected more strongly by eddy current.

The pattern width of each of the first and third coil patterns 100 and 300 when they are used as the NFC antenna 21 may be a constant value of W1 since a large current does not flow therein unlike the wireless power receiving coil 22. That is, the pattern width of each of the first and third coil patterns 100 and 300 may be the same as the pattern width of each of the innermost turns of the second and fourth coil patterns 200 and 400.

Figure 11:
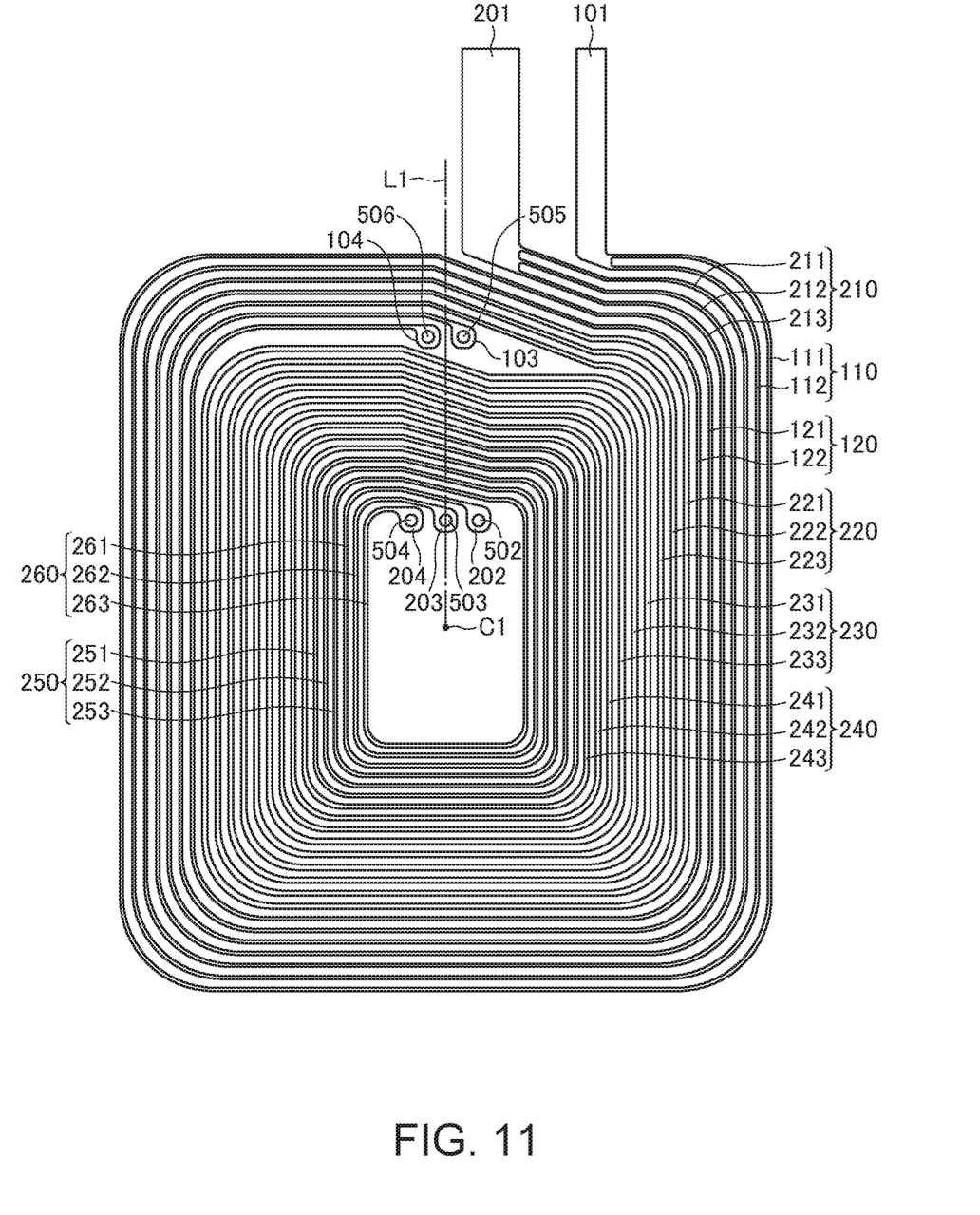
FIG. 11 is a plan view for explaining the pattern shapes of the first and second coil patterns 100 and 200 of a coil component according to a modification.
Figure 12:
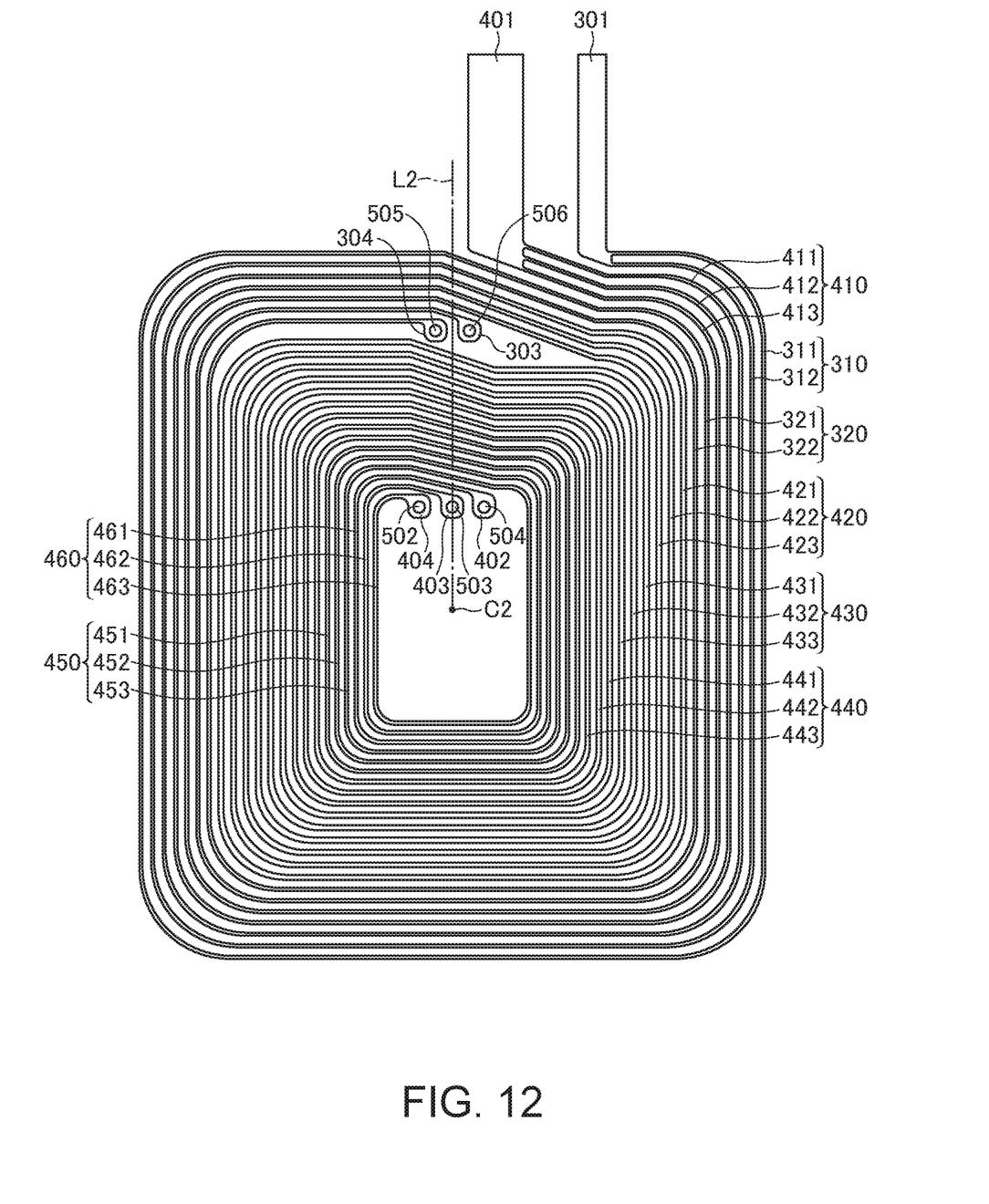
FIG. 12 is a plan view for explaining the pattern shapes of the third and fourth coil patterns 300 and 400 of the coil component according to the modification.

Further, as illustrated in FIGS. 11 and 12, the turns 110, 120, 310, and 320 constituting the first and third coil patterns 100 and 300 may each be radially divided by a spiral slit. In the example illustrated in FIGS. 11 and 12, the turn 110 is divided into two lines 111 and 112, the turn 120 is divided into two lines 121 and 122, the turn 310 is divided into two lines 311 and 312, and the turn 320 is divided into two lines 321 and 322. By thus radially dividing the turns constituting the first and third coil patterns 100 and 300 with the spiral-shaped slit, uneven distribution of current density can be reduced also in the first and third coil patterns 100 and 300.

In this case, the inner peripheral end of the first coil pattern 100 is constituted of an inner peripheral end 103 which is the end of the line 121 and an inner peripheral end 104 which is the end of the line 122. Similarly, the inner peripheral end of the third coil pattern 300 is constituted of an inner peripheral end 303 which is the end of the line 321 and an inner peripheral end 304 which is the end of the line 322. The inner peripheral ends 103 and 304 are connected to each other through a connection part 505 formed so as to penetrate the substrate 10, and the inner peripheral ends 104 and 303 are connected to each other through a connection part 506 formed so as to penetrate the substrate 10.

Figure 13:
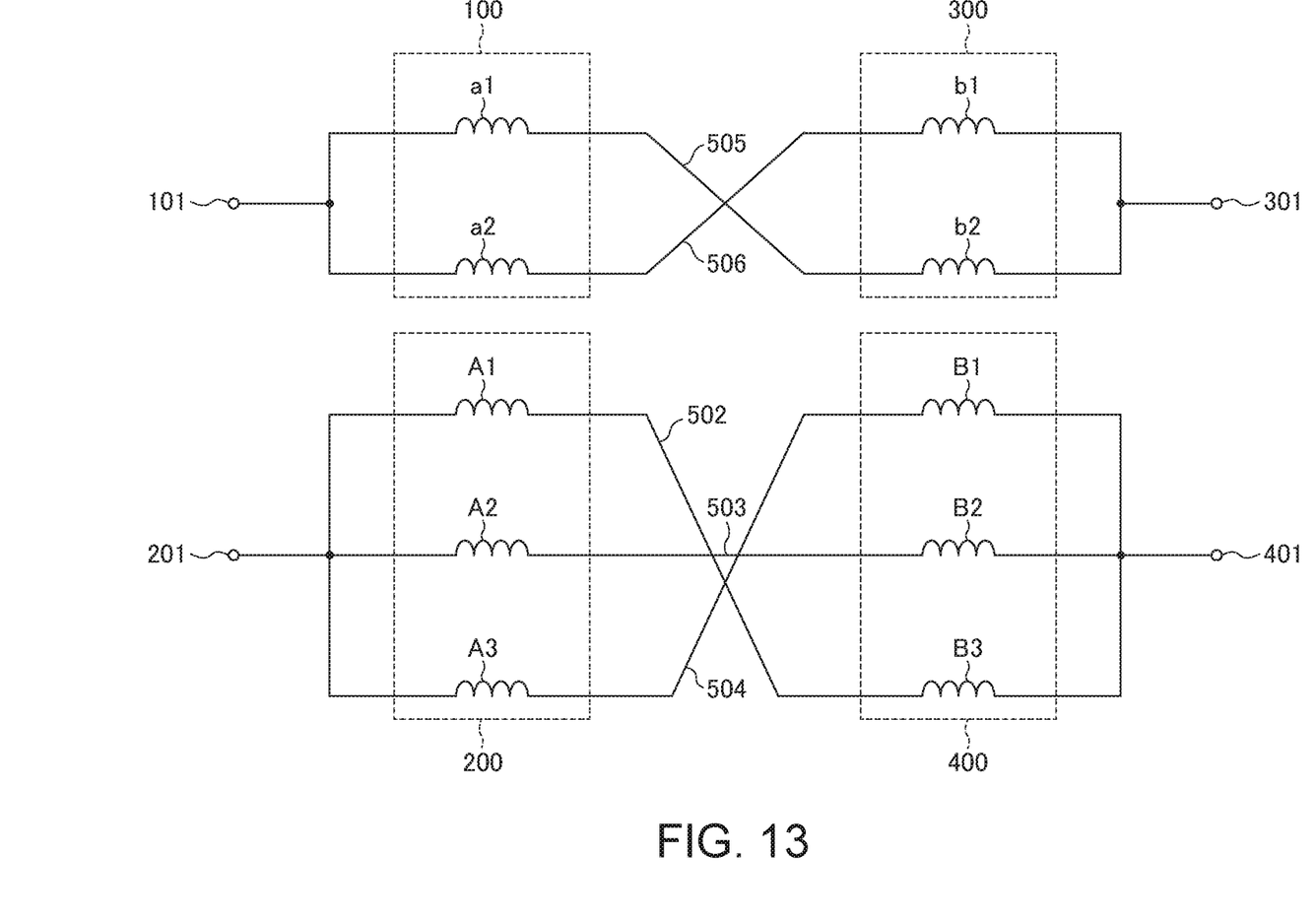
FIG. 13 is an equivalent circuit diagram of the coil component according to the modification.

Thus, as illustrated in FIG. 13, a division pattern a1 constituted of the lines 111 and 121 positioned on the outer peripheral side of the first coil pattern 100 is connected to a division pattern b2 constituted of the lines 312 and 322 positioned on the inner peripheral side of the third coil pattern 300 through the connection part 505, and a division pattern a2 constituted of the lines 112 and 122 positioned on the inner peripheral side of the first coil pattern 100 is connected to a division pattern b1 constituted of the lines 311 and 321 positioned on the outer peripheral side of the third coil pattern 300 through the connection part 506, thereby canceling a difference between dimensions of inner and outer peripheries for the first and third coil patterns 100 and 300. As a result, a DC resistance and an AC resistance can be reduced.

It is apparent that the present invention is not limited to the above embodiments, but may be modified and changed without departing from the scope and spirit of the invention.

For example, in the above embodiment, the turns constituting the second and fourth coil patterns 200 and 400 are each divided into three lines by the spiral-shaped slits; however, this point is not essential in the present invention. Further, when each turn is divided into the plurality of lines, the division number is not limited to three.

What is claimed is:

1. A coil component comprising:
a substrate having a first surface; and
first and second coil patterns coaxially formed on the first surface of the substrate and electrically isolated from each other,
wherein the first coil pattern has a plurality of turns including an outermost turn and a second outermost, that is a second turn counting from the outermost turn, and
wherein a predetermined turn of the second coil pattern is disposed between the outermost turn and the second outermost turn of the first coil pattern.

2. The coil component as claimed in claim 1, wherein the first and second coil patterns are different in number of turns.

3. The coil component as claimed in claim 2, wherein the second coil pattern has a larger number of turns than the first coil pattern.

4. The coil component as claimed in claim 1,
wherein the predetermined turn is an outermost turn of the second coil pattern.

5. The coil component as claimed in claim 4, wherein a pattern width of the predetermined turn of the second coil pattern is larger than a pattern width of the first turn of the outermost coil pattern.

6. The coil component as claimed in claim 5, wherein each of turns constituting the second coil pattern is radially divided into a plurality of lines by a spiral-shaped slit.

7. The coil component as claimed in claim 1, further comprising third and fourth coil patterns coaxially formed on a second surface of the substrate and electrically isolated from each other,
wherein an inner peripheral end of the third coil pattern is connected to an inner peripheral end of the first coil pattern, and
wherein an inner peripheral end of the fourth coil pattern is connected to an inner peripheral end of the second coil pattern.

8. The coil component as claimed in claim 7,
wherein the first and third coil patterns have a same pattern shape, and
wherein the second and fourth coil patterns have a same pattern shape.

9. A coil component comprising:
a first coil pattern comprising a plurality of turns including an outermost turn and a second outermost turn that is a second turn counting from the outermost turn; and
a second coil pattern comprising a plurality of turns,
wherein the second coil pattern has a larger number of turns than the first coil pattern, and
wherein of the second coil pattern is surrounded by the first coil pattern such that an outermost turn of the second coil pattern is arranged between the outermost turn and the second outermost turn of the first coil pattern.

10. The coil component as claimed in claim 9,
wherein an innermost end of the first coil pattern is arranged between the outermost turn of the second coil pattern and a second outermost turn of the second coil pattern.

11. The coil component as claimed in claim 9, further comprising:
a third coil pattern comprising a plurality of turns including third and fourth turns; and
a fourth coil pattern comprising a plurality of turns,
wherein of the fourth coil pattern is surrounded by the third coil pattern such that an outermost turn of the fourth coil pattern is arranged between the third and fourth turns of the third coil pattern,
wherein an innermost end of the first coil pattern is connected to an innermost end of the third coil pattern, and
wherein an innermost end of the second pattern is connected to an innermost end of the fourth coil pattern.

12. The coil component as claimed in claim 11, further comprising a substrate having first and second surfaces opposite to each other,
wherein the first and second coil patterns are formed on the first surface of the substrate, and
wherein the third and fourth coil patterns are formed on the second surface of the substrate.

13. The coil component as claimed in claim 4,
wherein the second coil pattern further includes a second outermost turn that is a second turn counting from the outermost turn of the second coil pattern, and
wherein the second outermost turn of the first coil pattern is disposed between the outermost turn of the second coil pattern and the second outermost turn of the second coil pattern.

14. The coil component as claimed in claim 1, wherein an innermost end of the first coil pattern is surrounded by the outermost turn of the second coil pattern.

15. The coil component as claimed in claim 1, wherein an innermost end of the first coil pattern is on the second outermost turn.

16. The coil component as claimed in claim 1, wherein an inner area of the first surface surrounded by an innermost turn of the second coil pattern is free from the first coil pattern.

17. The coil component as claimed in claim 9, wherein an innermost end of the first coil pattern is surrounded by the outermost turn of the second coil pattern.

18. The coil component as claimed in claim 9, wherein an innermost end of the first coil pattern is on the second outermost turn.

19. The coil component as claimed in claim 9, wherein an inner area surrounded by an innermost turn of the second coil pattern is free from the first coil pattern.

20. A coil component comprising:
a first coil pattern including a first turn; and
a second coil pattern including a second turn and a third turn,
wherein the second coil pattern has a larger number of turns than the first coil pattern,
wherein the first turn of the first coil pattern is spirally wound along a space between the second turn and the third turn of the second coil pattern.

* * * * *